United States Patent Office 3,065,277
Patented Nov. 20, 1962

3,065,277
PREPARATION OF HETERONUCLEAR NITRO-NAPHTHALENES AND DERIVATIVES
Julius Hyman, Piedmont, and Herbert P. C. Lee, Albany, Calif., assignors to Fundamental Research Company, Berkeley, Calif., a partnership
No Drawing. Filed Jan. 11, 1960, Ser. No. 1,427
10 Claims. (Cl. 260—645)

This invention relates to the preparation of certain compounds of naphthalene. More specifically, it relates to a process for preparing certain heteronuclear dinitronaphthalenes and their derivatives and to the compounds so prepared. By "heteronuclear dinitronaphthalenes" is meant compounds containing one and only one nitro group in each ring.

A principal object of the invention is a process for the dinitration of beta-nithronphthalene and substituted beta-nitronaphthalenes in such a manner as to avoid tri- or tetranitration during the process.

A further object of the invention is a process for preparing dinitronaphthalenes with simpler reagents and at less expense than in processes heretofore employed.

A still further object of the invention is an improved and simplified process for preparing 1,6- and 1,7-dinitronaphthalenes, starting with 2-nitronaphthalene.

A still further object of the invention is an improved and simplified process for preparing uniquely substituted dinitronaphthalenes.

The attainment of these and other objects of the invention will become evident on the further reading of this specification and the claims.

Certain dinitronaphthalenes have long been known as intermediates in the dyestuff industry and related fields. More recently, some have achieved prominence abroad as intermediates in the preparation of diisocyanates used in the manufacture of polyurethane resins. Improved methods for the production of the dinitronaphthalenes and their derivatives are therefore of considerable economic value.

The literature on the preparation of dinitronaphthalenes by the direct nitration of 2-nitronaphthalene, also called beta-nitronaphthalene and hereinafter referred to as $\beta$NN for convenience and brevity, is quite scanty (see Ward et al., Journal of the Chemical Society, page 487, February 1959). The only reported attempts at preparation heretofore by this route have been carried out using the conventional nitric acid-sulfuric acid or nitric acid-acetic anhydride mixtures as the nitrating agent. The sulfuric acid and acetic anhydride are used in such mixtures both as dehydrating agents to take up water formed in the reaction and also because of the theory that nitric acid exists in strong sulfuric acid and acetic anhydride as the nitryl ion, $NO_2+$, which is considered to be the effective nitrating agent (see Donaldson, "The Chemistry and Technology of Naphthalene Compounds," Arnold, London, 1958, pages 43 and 152).

We have found that, when nitration of $\beta$NN is attempted, employing as the nitrating agent the nitric acid-sulfuric acid or nitric acid-acetic anhydride mixture described, an apperciable amount of undesirable 1,3,8-trinitronaphthalene is produced at the expense of 1,6-dinitronaphthalene, and a lesser amount of 1,3,5-trinitronaphthalene at the expense of the 1,7-compound. This is true even when the nitration is carried out at temperatures as low as about 0° C. Or, if the attempt is made to avoid trinitration by decreasing the acid strength to provide milder conditions, the nitration is incomplete and considerable $\beta$NN remains unreacted.

We have now found that the formation of the undesirable trinitro compounds may be avoided completely by eliminating the concentrated sulfuric acid or acetic anhydride or any other dehydrating agent from the nitration mixture and using nitric acid alone, preferably in concentration between about 50 percent and 70 percent. When $\beta$NN is thus nitrated, the products are the desired 1,6- and 1,7-dinitronaphthalenes in nearly equal proportions. If the reaction is carried out at temperatures around 50° C., it proceeds relatively slowly; if, however, the reaction is performed at or near the reflux temperature (about 110°–130° C.) of concentrated (70 percent) nitric acid, the reaction is essentially complete in as little as 15 minutes. Further heating of the reaction mixture does not lead to further nitration, but only serves to increase somewhat the small amount of oxidized impurities formed.

Our discovery that $\beta$NN can be dinitrated to the 1,6- and 1,7-isomers with nitric acid as the sole nitrating agent, and without the aid of sulfuric acid, acetic anhydride or other dehydrating agent is directly opposed to the teachings of the prior art, which, as previously noted, has maintained that the presence of such an adjuvant is necessary to take up the water formed in the nitration reaction and to supply the allegedly necessary nitryl ions $NO_2+$. The fact that complete dinitration can be secured without such an adjuvant in as little as 15 or 20 minutes as described in Examples II and III below, and with acid no stronger than the ordinary concentrated 70 percent reagent, in which the nitryl ion is known to be non-existent, or at best, in extremely low concentration, is therefore especially striking and constitutes a marked advance in the art of aromatic nitration. This advance becomes even more noteworthy when it is coupled with our discovery that by this same process the desired nitration stops at the dinitro stage, without the highly undesirable overnitration to the tri- or tetranitro compounds.

The fact that the process of our invention is preferably carried out with nitric acid not exceeding 70 percent $HNO_3$ concentration as the sole nitrating agent also greatly simplifies the recovery of spent acid, since this concentration is that of the constant boiling acid. We have found that concentrations much above 70 percent can cause the addition of two nitro groups instead of one, and that with prolonged boiling with fuming acid trinitration may be substantially complete.

The heteronuclear incorporation of a second nitro group according to the process of our invention is not confined to $\beta$NN alone but applies as well to other naphthalene derivatives already possessing a single nitro group in a beta position, as for example a chloro-$\beta$NN or a $\beta$NN sulfonic acid. More specifically, for example, the nitration with boiling concentrated nitric acid of 1-chloro-3-nitronaphthalene yields a mixture of 3,5- and 3,8-dinitro-1-chloronaphthalene; and like treatment of 1,2-dichloro-3-nitronaphthalene yields a mixture of 3,5- and 3,8-dinitro-1,2-dichloronaphthalenes. Similarly, the nitration of 6-nitro-1-naphthalene sulfonic acid yields primarily 3,6-dinitronaphthalenesulfonic acid together with minor amounts of 1,6-dinitronaphthalene and 4,6-dinitro-1-naphthalene sulfonic acid.

Generally speaking, the nitric acid employed in the process of our invention should have a concentration of at least about 50 percent $HNO_3$. The temperature at which the reaction is carried out is preferably at or near the reflux temperature of the solution, such as 110°–130° C. in the case of concentrated nitric acid. At temperatures much below the reflux temperature, we have found that reaction velocities are too low or yields too small to be considered practical.

With this background of the basic principles of our invention we shall now describe several examples of preparations employing these principles in practice. These examples are obviously given for the purpose of illustration and not of limitation.

Example I 100 parts by weight of βNN were added to 425 parts of concentrated nitric acid (70 percent). On warming, the βNN dissolved in the acid. The mixture was stirred for 1.5 hours at a temperature of 110° C. It was then cooled and poured into 3 volumes of water, and the solids filtered off and washed with water. These solids were then boiled with water to facilitate the removal of acids, and finally filtered, washed and dried. The yield was 107.5 parts of mixed 1,6- and 1,7-dinitronaphthalenes, free of other nitronaphthalenes.

Example II 5 parts by weight of βNN were mixed with 35 parts of concentrated (70 percent) nitric acid. The reaction mixture was kept at a temperature of 120° C. for 15 minutes. It was then poured into water and worked up as in Example I. Infra-red spectroscopic examination of the product showed that it was a mixture of 1,6- and 1,7-dinitronaphthalenes, free of βNN.

Example III 1 part by weight of 1-chloro-3-nitronaphthalene was added to 20 parts of 70 percent nitric acid and the mixture boiled for 20 minutes. It was then poured into an excess of water, giving a yellowish-white curdy precipitate which was filtered, washed with water and dried. Examination showed this product to be a mixture of 3,5- and 3,8-dinitro-1-chloronaphthalenes, free of starting material.

Example IV 1.5 parts by weight of 1,2-dichloro-3-nitronaphthalene were boiled 30 minutes with 30 parts concentrated (70 percent) nitric acid. The reaction mixture was then poured into an excess of water. The resulting precipitate was washed with water and dried. Examination of this product showed it to consist of a mixture of 3,5- and 3,8-dinitro-1,2-dichloronaphthalenes.

Example V 25 parts by weight of 6-nitro-1-naphthalene sulfonic acid (Nitro-Dahl acid) were dissolved in 100 parts concentrated (70 percent) nitric acid. This reaction mixture was stirred for 3.5 hours at 120° C. It was then poured into water. The resulting solution was filtered to remove an insoluble component, which proved to be pure 1,6-dinitro-naphthalene. The filtrate was neutralized with soda ash, and saturated with salt. The resulting precipitate was identified by infra-red spectroscopic examination as consisting largely of the sodium salt of 3,6-dinitro-1-naphthalene sulfonic acid, together with a small amount of 4,6-dinitro-1-naphthalene sulfonic acid.

Unless otherwise indicated, the identity of all the products prepared in the above examples was established by infra-red spectroscopic comparison with samples of the same materials of known purity.

While the avoidance of overnitration made possible by the process of our invention is desirable in many ways, it is particularly important when the dinitro compounds are utilized in the preparation of diisocyanates employed in the manufacture of polyurethane resins, since a third isocyanate group by promoting cross-linking would interfere seriously with proper polymerization, and would produce a final product of inferior quality.

The many modifications of our invention which will naturally suggest themselves to one skilled in the art are comprehended within the scope of the invention as limited only by the claims.

We claim:

1. A process for incorporating only one additional nitro group heteronuclearly into a napththalene derivative taken from the class consisting of beta-nitronaphthalene, chloro-beta-nitronaphthalenes, and beta-nitronaphthalene sulfonic acids which comprises reacting said derivative with an agent consisting essentially of nitric acid of a concentration of about 50–70 percent.

2. A process for incorporating only one additional nitro group heteronuclearly into beta-nitronaphthalene comprising reacting beta-nitronaphthalene with an agent consisting essentially of nitric acid of a concentration of about 50–70 percent.

3. A process for further nitrating a naphthalene derivative taken from the class consisting of beta-nitronapthalenes, chloro-beta-naphthalenes, and beta-nitronaphthalene sulfonic acids which comprises heating said naphthalene derivative with an agent consisting essentially of nitric acid of a concentration of about 50–70 percent, whereby only a single further nitro group is introduced into said naphthalene derivative heteronuclearly.

4. A process for incorporating only one additional nitro group heteronuclearly into a naphthalene derivative taken from the class consisting of a beta-nitronaphthalene, chloro-beta-nitronaphthalenes, and beta-nitronaphthalene sulfonic acid which comprises dissolving said napthalene derivative in an agent consisting essentially of concentrated nitric acid, and maintaining the temperature of the resulting solution at substantially its reflux temperature.

5. A process for preparing a mixture consisting of 1,6- and 1,7-dinitronaphthalene which comprises heating 2-nitronaphthalene with an agent consisting essentially of nitric acid of a concentration of about 50–70 percent.

6. A process according to claim 5 in which the temperature of the reaction mixture is maintained within the range of about 110° C. to about 130° C.

7. A process for incorporating by nitration only one additional nitro group heteronuclearly into a naphthalene derivative taken from the class consisting of beta-nitronaphthalene, chloro-beta-nitronaphthalenes, and beta-nitronaphthalene sulfonic acids which comprises treating said naphthalene derivative with an agent consisting essentially of nitric acid of a concentration af at least 50 percent and not in excess of about 70 percent at an elevated temperature until dinitration is essentially complete, and recovering the dinitrated product so produced.

8. A process according to claim 7 in which the naphthalene derivative to be nitrated is 1-chloro-3-nitronaphthalene and the nitrated product is a mixture of 1-chloro-3,5 - dinitronaphthalene and 1 - chloro-3,8-dinitronaphthalene.

9. A process according to claim 7 in which the naphthalene derivative to be nitrated is 1,2-dichloro-3-nitronaphthalene and the nitrated product is a mixture of 1,2-dichloro-3,5-dinitronaphthalene and 1,2-dichloro-3,8-dinitronaphthalene.

10. A process according to claim 7 in which the naphthalene derivative to be nitrated is 2-nitronaphthalene-5-sulfonic acid and the nitrated product is a mixture of 3,6-dinitro-1-naphthalene sulfonic acid and 4,6-dinitro-1-naphthalene sulfonic acid.

References Cited in the file of this patent

UNITED STATES PATENTS 2,864,871    Morningstar _____ Dec. 16, 1958

OTHER REFERENCES

Vesely et al.: Bull. Soc. Chim. (France), vol. 33, p. 952–955 (1923). (Copy in S.L.)

De La Mare et al.: "Aromatic Substitution-Nitration and Halogenation," published by Academic Press, Inc. (1959), pages 179 and 180 are relied upon.